April 27, 1943. H. L. HULL 2,317,383
AUTOMATIC CONTROL SYSTEM FOR DIRIGIBLE CRAFT
Filed Jan. 27, 1940 2 Sheets-Sheet 1

INVENTOR
HARVARD L. HULL,
BY
his ATTORNEY.

April 27, 1943.   H. L. HULL   2,317,383
AUTOMATIC CONTROL SYSTEM FOR DIRIGIBLE CRAFT
Filed Jan. 27, 1940   2 Sheets-Sheet 2

INVENTOR
HARVARD L. HULL,
BY
Herbert H. Thompson
ATTORNEY

UNITED STATES PATENT OFFICE 2,317,383

AUTOMATIC CONTROL SYSTEM FOR DIRIGIBLE CRAFT

Harvard L. Hull, Leonia, N. J., assignor to Sperry Gyroscope Company, Inc., Brooklyn, N. Y., a corporation of New York Application January 27, 1940, Serial No. 315,913

26 Claims. (Cl. 244—76)

This invention relates to automatic steering and control systems for airplanes or other dirigible craft, in which a direction maintaining instrument which may be a magnetic compass or a gyroscopically stabilized device is employed as a controlling member.

The course or attitude of such craft is commonly controlled by positioning a rudder or other movable surface, which, when angularly displaced from a central position, is acted upon by an unbalanced fluid pressure and causes a turning moment to be exerted upon the craft. For automatic control a moment in the proper direction to return the craft to course is applied when comparison with the directional instrument indicates deviation from course. According to the present invention this is effected by displacing a control surface from its central position by an amount which causes the pressure exerted upon the surface to be primarily proportional to the angle of deviation or departure of the craft.

Since pressure on a surface displaced with respect to the longitudinal axis of a craft is dependent not only upon the magnitude of the displacement but also upon the speed of the craft, a control system of this type has the desirable property of applying more correction at low speeds and less correction at high speeds than a system in which displacement of the control surface alone and not the pressure or force on the surface is made proportional to departure from course.

An object whose angular position is controlled by a follow-up system which applies a turning moment proportional only to departure from a reference position will exhibit a tendency to overshoot its proper position of rest and to hunt about that position. To prevent this, the present invention provides means for modifying the applied torque by adding to the primary control term, which is proportional to departure, a secondary term proportional to the rate of change of departure and in some cases a higher order derivative term. The rate or velocity term is combined with the primary control term in a sense such that as the craft swings towards its true course the rudder is centralized more rapidly than would otherwise be the case and may be reversed before the craft returns to the course, thereby preventing overshooting and overcoming any tendency of the craft to hunt by providing a damping force.

Since a compass or other sensitive controlling element cannot directly apply sufficient torque to operate a rudder or similar control surface, where automatic control is required a servo system is of necessity employed to increase the available torque and this torque amplifying servo system may itself exhibit a tendency to hunt and oscillate the rudder which is distinct from the tendency of the craft to hunt about the course. To overcome this tendency toward internal hunting, in contrast to external hunting or hunting of the craft as a whole, the invention provides means for controlling the operation of the servo motor in accordance with a composite term which includes a primary signal proportional to the rudder pressure to be applied by the servo motor and a secondary signal proportional to the rate at which the primary signal varies. By this type of control, hunting of the servo system and oscillation of the connected rudder is prevented in a manner similar to that in which hunting of the craft is prevented.

The means for generating a rate signal and combining it with a displacement signal and the means for generating a repeat-back signal may take a variety of forms within the scope of the invention. A preferred form is illustrated in which all such means are electrical, resulting in compactness and the elimination of mechanical connections between the transmitting and receiving stations of the control system.

It is to be noted that while for purposes of illustration in certain parts of this specification and in the claims the use of the improved system of the invention for azimuth control is referred to, it will readily be understood that in the case of aircraft the system is equally applicable (and such use is contemplated) to position an elevator or aileron surfaces to control angular motion about the lateral and/or longitudinal axes of the craft, the equivalent of the azimuth deviation signal being generated by angular displacement from reference positions relative to these axes.

One object of the invention is to provide an anti-hunt steering or control system for a dirigible craft.

Another object is to provide means for applying a corrective turning moment to a yawing craft which is proportional to deviation from course and to a time derivative or derivatives of such deviation.

A further object is to provide a control system in which a sensitive directional element controls the course or attitude of a craft without hunting by means of a servo system which itself operates in a dead beat manner.

Still another object is to provide an electrically controlled hydraulic servo system with electrical repeat-back responsive to hydraulic pressure.

Figure 1:
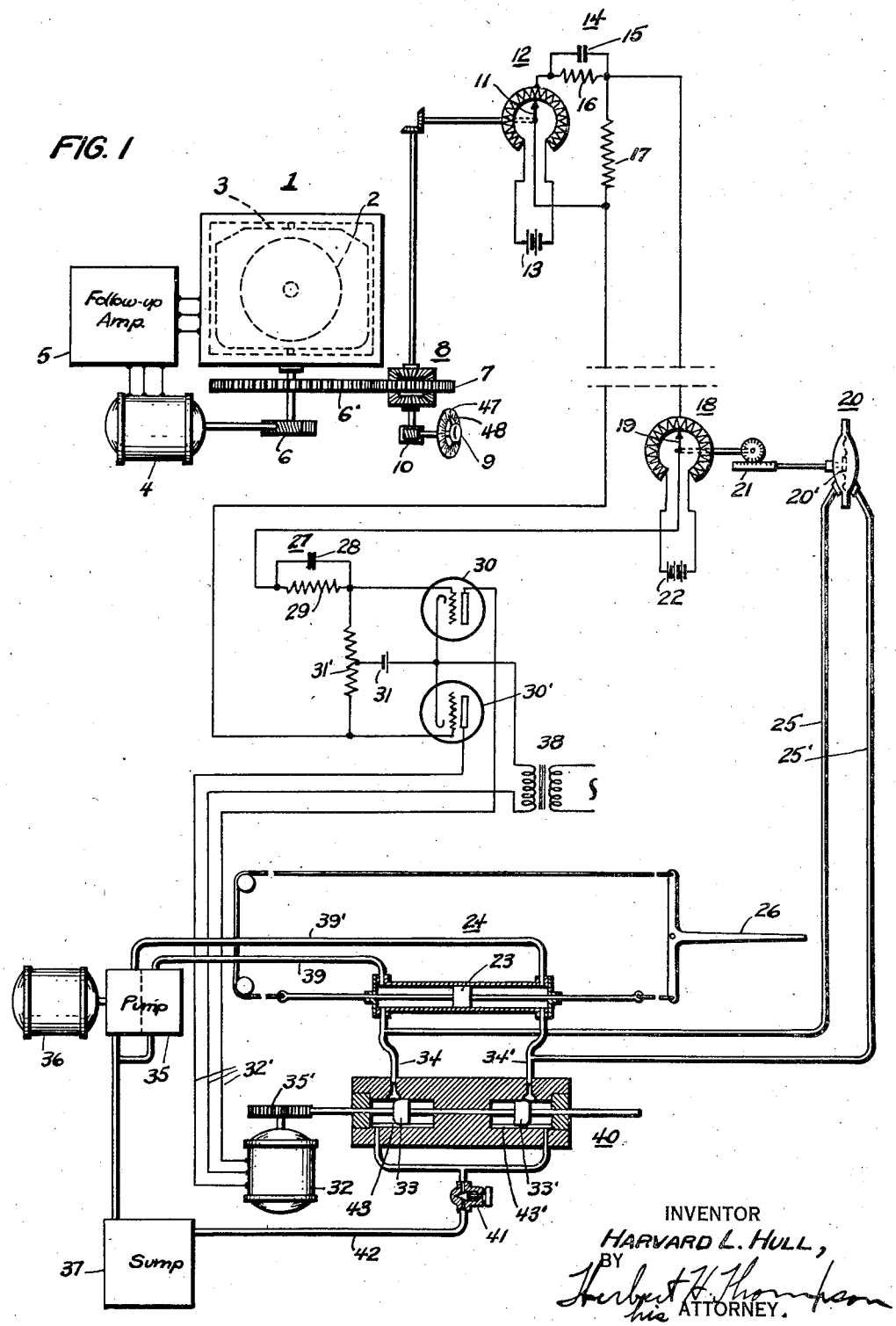
Fig. 1 is a schematic diagram of one form of control system according to the invention in which rate generating circuits are associated with a signal generator at the compass and with the motor input circuit.

Referring particularly to the system of Fig. 1, reference numeral 1 is applied generally to a sensitive direction maintaining instrument mounted on a dirigible craft such as a ship or airplane, said instrument being shown in elevation as a gyroscopic compass or directional gyroscope having a rotor 2 spinning about a horizontal axis and a follow-up member or "phantom" 3 the vertical plane of which is maintained in fixed azimuth relationship to a vertical plane normal to the spin axis of the rotor by driving motor 4 controlled by follow-up amplifier 5. A suitable type of follow-up amplifier and associated apparatus for causing motor 4 to maintain "phantom" 3 in alignment with rotor 2 is shown in U. S. Patent 2,139,558, issued December 6, 1938, to F. L. Moseley, W. T. Cooke and C. A. Frische.

When a deviation of the fore and aft axis of the craft from the set course occurs, rotor 2 is displaced relative to the housing of the compass and motor 4, actuated by follow-up amplifier 5, rotates "phantom" 3 by means of worm drive 6 to maintain the fixed relation of this member to rotor 2. The rotation of "phantom" 3 is transmitted by gear 6' on the "phantom" shaft to ring gear 7 constituting one arm of a mechanical differential 8, a second arm of which is movable by means of course setting knob 9 through worm and wheel drive 10 and the third arm of which rotates movable contact 11 of compass potentiometer 12. The resistance winding of potentiometer 12 is connected across battery 13 and a mid tap of said winding is connected to parallel circuit 14 consisting of condenser 15 and resistance 16. When contact 11 is in its central position, no voltage is applied to circuit 14 but as this contact is displaced to one side or the other of its central position a voltage is applied to circuit 14 proportional to the angle through which contact 11 is rotated and whose sense or polarity is determined by the direction in which the contact moves from its central position.

The current through circuit 14 divides into two parts corresponding to the respective paths through condenser 15 and resistance 16, and a voltage drop across resistor 17 is produced by this current proportional to its two components. The series circuit comprising condenser 15 and resistance 17 acts as a differentiating device and the component of the potential across resistor 17 due to the current through the condenser is proportional to the rate of change of potential applied to circuit 14. The current through resistance 16 produces a potential component across 17 which is in phase with the input potential. In this manner a difference of potential exists across resistor 17 proportional to departure from course or yaw and to the rate of change of departure or yaw.

The principle of the anti-hunt feature of the servo motor control circuit as represented by circuits 14 and 27 has been disclosed in my copending U. S. application, Serial No. 148,653, filed June 17, 1937, now U. S. Patent No. 2,233,415, in which the use of a parallel resistance-capacity circuit in series with a resistance as a differentiating and combining device for preventing hunting of a follow-up system is described and the relation of the circuit constants discussed.

Added to the potential across resistor 17 is the potential derived from repeat-back potentiometer 18 which has a movable contact 19 actuated by differential pressure relay 20 through rack and pinion 21. Battery 22 is connected across the resistance winding of potentiometer 18 and a mid tap of this winding is connected to one terminal of resistance 17. A voltage proportional to the difference in between the pressures acting on the two sides of the resilient diaphragm 20' of relay 20 is taken from potentiometer 18 as contact 19 is displaced in response to flexure of the diaphragm and this voltage is applied in series with the potential across resistance 17 in a sense to oppose the potential difference thereacross.

The pressures acting on the opposite faces of diaphragm 20' are those existing on the opposite ends of piston 23 of hydraulic motor 24 which are transmitted through connecting lines 34, 25 and 34', 25' respectively. Piston 23 is operatively connected to rotate rudder surface 26, and the net force resulting from a difference of pressure on the two ends of piston 23 is balanced by the net force exerted upon rudder 26. The differential pressure on the piston is therefore proportional to the resultant fluid pressure on the rudder. It will be apparent then that the reversible potential derived from potentiometer 18 by the displacement of contact 19 is a pressure repeat-back signal since it is proportional to the pressure on the displaced rudder surface.

The algebraic sum of the deviation, rate of deviation and pressure repeat-back signals is applied as a potential to circuit 27 consisting of condenser 28 and resistance 29 connected in parallel. Resistance 29 passes a current proportional to the applied potential, while condenser 28 in cooperation with resistance 31' differentiates this potential, the sum of the currents in the two branches causing a difference of potential across center-tapped resistance 31' which is applied to the grids of electron tubes 30 and 30', connected in a balanced circuit and negatively biased to act as rectifiers by grid battery 31.

The plates of tubes 30 and 30' are connected to oppositely poled field windings (not shown) of reversible motor 32, which may be of any suitable type, by leads 32'. The common connection or junction of the fields of this motor is connected to one end of the secondary winding of supply transformer 38, the other end of which is connected to the cathodes of the tubes. Transformer 38 is fed from a suitable A. C. supply. By this arrangement, a potential difference of one polarity across the grids of tubes 30 and 30' causes rectified current to flow through one of the field windings and rotate motor 32 in one direction while a signal of the opposite polarity causes current to flow in the other winding and rotate the motor in the opposite direction. Motor 32 may, for example, be of a series type.

Motor 32 is connected by rack and pinion 35' to valve pistons 33 and 33' of valve 40 arranged to differentially control the openings of ports in pressure lines 34 and 34', respectively, leading from opposite ends of the cylinder of hydraulic motor 24. A two unit pump 35, driven by motor 36, maintains a continuous flow of fluid from sump 37 through two parallel paths, one by way of supply line 39 to the left hand end of the cylinder of motor 24, line 34 to the left hand end of dual valve 40 and to sump 37 through common throttling valve 41 and tail pipe 42 and the other by way of supply line 39', right hand end of the motor cylinder, line 34' right hand end of valve 40 and to the sump by the common connection.

Valve pistons 33 and 33' normally partially and equally uncover the ports connected with lines 34 and 34' respectively, resulting in equal pressures on the two ends of piston 23, under which condition no torque is exerted on rudder 26 and this surface is centralized. When pistons 33 and 33' are displaced by the rotation of motor 32, the port openings are changed differentially, one port being further uncovered and the other restricted causing differential changes of pressure on the two sides of piston 23 and thereby causing this piston to displace rudder 26 until the pressure exerted on this control surface is proportional to and balances the net pressure on piston 23.

Throttling valve 41 in the common return line is adapted to control the stand-by pressure of the system. It is desirable to provide means for hydrostatically balancing the pistons which may be done by by-passes 43 and 43'.

The operation of the system shown in Fig. 1 is as follows: While the ship is proceeding along the set course, the vertical plane of "phantom" element 3 of compass 1 is stationary and, for example, aligned with a vertical plane normal to the spin axis of rotor 2 and no unbalanced fluid pressure is exerted upon rudder 26. No electrical signal is then derived from potentiometers 12 and 18 and none is applied to the grids of the tubes 30, 30'. When departure from course occurs, the housing of compass 1 which moves with the craft is displaced with respect to rotor 2. "Phantom" element 3 is then moved by motor 4 into alignment with the rotor and as this movement causes a displacement of contact arm 11 of potentiometer 12 from its central position, a potential is applied to circuit 14 and a potential appears across resistor 17 proportional both to the angle of departure and to the rate of change of that angle. This signal potential is applied to the grids of tubes 30, 30' and the resulting differential change of plate currents of these tubes causes motor 32 to be operated in one direction or the other and thereby displace the pistons of dual valve 40 and differentially change the ports openings in this valve. The differential change of port opening causes unequal pressures to be exerted upon the two ends of piston 23 which is thereby caused to move rudder surface 26 in a direction to return the craft to its course. The unequal pressures on piston 23 are also applied to diaphragm 20' of pressure relay 20 by way of connecting pressures lines and the resulting displacement of this diaphragm causes movable contact arm 19 of potentiometer 18 to be displaced from its central position and tap off a repeat-back potential from potentiometer 18 which opposes the primary signal across resistor 17. This repeat-back signal therefore decreases the net signal applied to the grids of tubes 30, 30', and eventually reduces it to zero. The rudder as it moves from its central position experiences an increasing unbalanced fluid pressure and the relation between rudder movement and repeat-back signal may be adjusted so that a deviation of the craft from course will cause any desired pressure to be exerted on the rudder at equilibrium and hence any desired turning moment to be exerted on the craft.

In the above discussion the effect of the deviation rate signal has so far been neglected. As the ship yaws from the course and causes a signal to be generated by potentiometer 12, the rate of change of this signal is generated by the cooperation of condenser 15 in circuit 14 and resistance 17 and added to the primary signal thereby speeding up the turning of rudder 26. As the ship returns to its course and the sign of the rate signal is reversed, the rudder is centralized sooner than would be the case if the primary signal were acting alone. If there is any tendency to overshoot the course, the primary and rate signals, both acting in the same direction after the course line is passed to apply reverse rudder, oppose such tendency.

While the differentiating and combining means including circuit 14 acts to prevent hunting of the craft about the course, the means of which circuit 27 is a part is designed to prevent hunting of the servo system and consequent oscillation of the rudder which may occur at a relatively higher frequency. In circuit 27, the charging current of condenser 28 generates the rate of change of the signal applied to the condenser as a voltage drop across resistance 31' and the combination of said signal and its rate applied to tubes 30, 30' prevents servo system or internal hunting by modifying the operation of motor 32 to overcome the effect of the inertia of the connected moving members.

For setting a course, knob 9 is turned until the desired course is read on dial 47 by means of index 48. Rotation of this knob moves contact 11 of potentiometer 12 through differential 8 without disturbing the position of "phantom" 3 owing to non-reversible worm drive 6. This generates a primary signal which will only be balanced when the craft has turned through an angle which causes motor 4 to realign "phantom" 3 and so return contact 11 to its central position.

Figure 2:
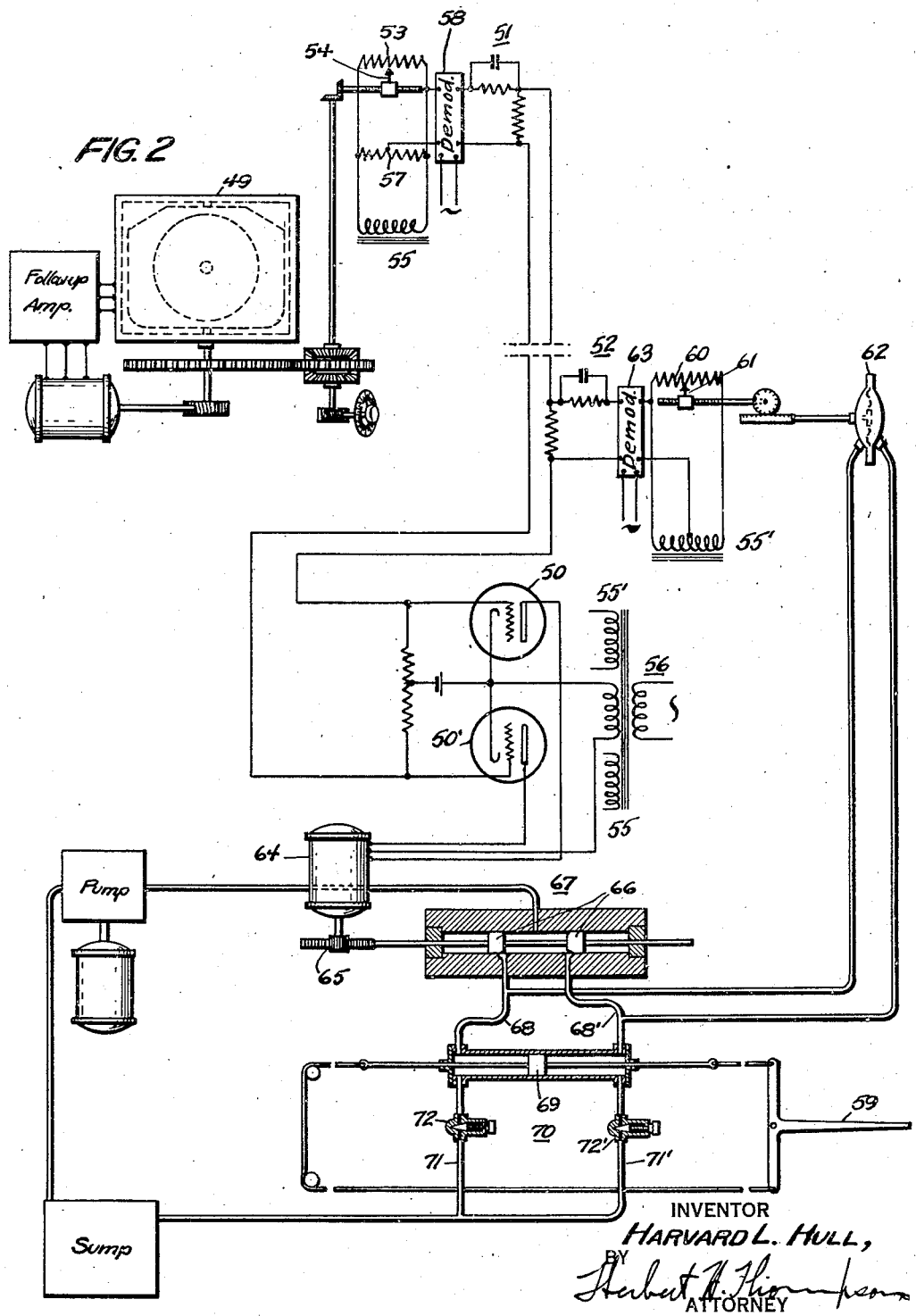
Fig. 2 is a schematic diagram showing a modification of the circuits of Fig. 1 in which the second rate circuit is associated with the repeat-back signal generator.

The system of Fig. 2 which is a modification in several respects of that shown in Fig. 1 employs a rate generating circuit for obtaining the rate of change of the repeat-back signal and the combination of repeat-back signal and its rate of change opposes the combination of primary signal and its rate. The relation of this system to the one shown in Fig. 1 is best seen by considering the mathematical relationship of the several control terms. If the primary signal, proportional to angular departure from course, is represented by the symbol $\theta$ and the repeat-back signal, proportional to pressure on the rudder or other control surface by the symbol $\phi$, the time rate of change of the primary signal will be represented by $$\frac{d\theta}{dt}$$

and the rate of change of the repeat-back signal by $$\frac{d\phi}{dt}$$

Second order rates or derivatives will be represented by $$\frac{d^2\theta}{dt^2} \text{ and } \frac{d^2\phi}{dt^2}$$

In the system according to Fig. 1 the potential applied to the grids of tubes 30, 30' has components proportional to $\theta, \phi$, $$\frac{d\phi}{dt}, \frac{d\theta}{dt} \text{ and } \frac{d^2\theta}{dt^2}$$

Resistors 16 and 29 pass the $\theta$ and $\phi$ components unchanged. Condenser 16 to which a potential proportional to $\theta$ is applied generates a $$\frac{d\theta}{dt}$$

term which is passed unchanged by resistance 29 while condenser 27 differentiates the $\theta$, $\phi$ and $$\frac{d\theta}{dt}$$

terms resulting in components in $$\frac{d\theta}{dt}, \frac{d\phi}{dt}, \text{ and } \frac{d^2\theta}{dt^2}$$

The relative magnitude of the several components depends upon the constants of the circuits. For example, the rate at which a ship or aircraft yaws will ordinarily be considerably slower than the rate at which the servo system hunts and in consequence, the capacity of condenser 16 in relation to the resistance across the terminals of resistor 17 is chosen, as disclosed in U. S. Patent No. 2,233,415 previously referred to, so that it is suitable for differentiating a voltage varying at yaw frequency while the capacity of condenser 28, in relation to the resistance of 31', is suitable for differentiating at the frequency of servo system hunting.

Under the postulated conditions the capacity of condenser 28 will be relatively small and its reactance at yaw frequency relatively high with the result that only a small proportion of the $$\frac{d^2\theta}{dt^2}$$

potential generated by said condenser appears across resistor 31'. As yaw and hunt frequencies draw closer together the circuit can be designed to increase the usable portion of second derivative voltage which as is well known may be employed to further decrease the tendency to hunt.

If the second derivative of the yaw signal is neglected the terms representing the component potentials applied to tubes 30 and 30' may be grouped as follows:

$$\theta - \phi \text{ and } \frac{d}{dt}(\theta - \phi)$$

the negative signs indicating that the potentials are combined in opposition. The first term represents the lag of the rudder in taking a position where the fluid pressure on it is proportional to deviation from course and the second term represents the rate at which this lag changes. The grouping of the difference of the two rate terms $$\frac{d\theta}{dt} \text{ and } \frac{d\phi}{dt}$$

as the rate of difference $$\frac{d}{dt}(\theta - \phi)$$

is justifiable mathematically since both $\theta$ and $\phi$ may be expressed as functions of a single variable, $t$, that is, of time.

In the circuit of Fig. 2 the potential applied to the grids of tubes 50 and 50' is proportional to $\theta$, $\phi$, $$\frac{d\theta}{dt} \text{ and } \frac{d\phi}{dt}$$

the two rates being generated independently by the condensers of circuits 51 and 52. The above terms may be grouped into two difference terms as was done in case of the circuit of Fig. 1:

$$\theta - \phi \text{ and } \frac{d}{dt}(\theta - \phi)$$

showing that the two circuits are equivalent when the yaw second derivative term is negligible.

Referring now in detail to the arrangements of Fig. 2, there is shown a potentiometer 53 having a movable contact 54 arranged to be moved in correspondence with a follow-up element of a directional instrument through differential gearing in a manner similar to the actuation of the corresponding elements of Fig. 1. Directional instrument 49, if considered to be shown in elevation, may be a compass or directional gyroscope as in Fig. 1 or if considered to be shown in a plan view, either or both instruments may represent gyro horizons in which case the alignment of the follow-up element or "phantom" will cause a signal proportional to rotation of the craft about a horizontal axes to be generated. Either the directional gyro or gyro horizon or both may be a part of the conventional control unit of an automatic pilot. Potentiometer 53 has applied to its winding an A. C. potential from one of the secondary windings 55 of transformer 56 whose primary is supplied from a suitable alternating current source. To derive the electrical center of potentiometer 53 as a reference point there is bridged across the terminals thereof a center-tapped resistor 57 so that when movable contact 54 is in its central position, no A. C. potential difference exists between this contact and the mid point of resistor 57. When contact 54 is displaced from its central position, due to a departure from course of the craft, the A. C. potential between contact 54 and the center tap of resistor 57, whose phase depends upon which side of its central position contact 54 rests, is applied to demodulator or rectifier 58 of any suitable type thereby resulting in a direct current signal of reversible polarity as a component of the output of said demodulator. Balanced demodulating or rectifying means for changing reversible phase A. C. to reversible polarity D. C. are well known in the art and are shown, for example, in U. S. Patent #2,088,654, issued August 3, 1937 to the present applicant. In place of center-tapped potentiometers, other means for obtaining reversible phase A. C. signals proportional to displacement may be employed as, for example, a "Selsyn" transmitter used as a signal generator. Such A. C. inductive transmitters are shown in U. S. Patent #2,054,945, issued September 22, 1936 to R. H. Nisbet.

In a similar manner, a reversible phase A. C. signal proportional to the pressure on rudder surface 59 is generated by potentiometer 60 which has a movable contact 61 actuated by differential pressure relay 62 and a reversible potential D. C. signal is derived therefrom by means of a demodulator 63. Potentiometer 60 is shown as effectively center-tapped by being energized from center-tapped secondary winding 55' of transformer 56. The D. C. signals from demodulators 58 and 63 are separately applied to rate circuits 51 and 52, respectively, and the combined signal which contains components proportional to departure, rate of change of departure, repeat-back pressure, and rate of change of repeat-back pressure, is applied to the grids of tubes 50 and 50' for controlling motor 64 which corresponds in function to motor 32 of Fig. 1.

A variation of the hydraulic motor and control valve of Fig. 1 is shown in which motor 64 through gearing 65 moves the double piston 66 of hydraulic valve 67 in a manner to differentially open the ports connected with pressure lines 68 and 68', thereby causing a differential pressure to be exerted on piston 69 of reversible hydraulic motor 70. The motion of piston 69 under the influence of this pressure displaces rudder surface 59. In the two tail lines 71 and 71' there are inserted throttle valves 72 and 72', respectively, by means of which the working or stand-by pressures in motor 70 may be regulated.

The details of Fig. 2 and the features of operation not described will be apparent from the description of the system of Fig. 1. The distinctive feature of the system of Fig. 2 is the position of the circuit for obtaining the rate of change of the rudder pressure repeat-back signal which in this case is directly associated with the generator of this signal. The equivalence of the arrangements of Fig. 2 and of Fig. 1 when second order derivatives are neglected, has been pointed out.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In automatic steering apparatus for dirigible craft, a direction maintaining instrument, means for setting a course relative to the direction maintained by said instrument, a rudder, means for returning the craft to the set course responsive to departure therefrom including a servo system operatively connected to position said rudder, and a controller for said servo system continuously actuated in accordance with a combination of the force due to fluid pressure on said rudder and the rate of change of said force.

2. In automatic steering apparatus for dirigible craft, a direction maintaining instrument, a rudder, and anti-hunting motive means for positioning said rudder to steer a course substantially in fixed relationship to the direction maintained by said instrument, including, a servo system for actuating said rudder, means for controlling said servo system in accordance with departure from course and in accordance with a time derivative thereof, and further means for continuously applying a controlling input to said servo system in accordance with the force due to fluid pressure upon said rudder and a time derivative of change of said force.

3. In automatic steering apparatus for dirigible craft, a direction maintaining instrument, means for steering a yawing craft along a mean course settable with respect to the direction maintained by said instrument, including course setting means, a rudder, means responsive to yaw for positioning said rudder to exert a corrective turning moment on the craft substantially proportional to yaw and to rate of change of yaw, said last means including a rudder-actuating servo system and repeat-back means suitable for continuously controlling said servo system in opposition to said yaw responsive control in accordance with a combination of the force due to fluid pressure exerted upon said rudder and the rate of change of said force.

4. In automatic steering apparatus for dirigible craft, a direction maintaining instrument, means for setting a course relative to the direction maintained by said instrument, a rudder, a servo system for positioning said rudder, means for generating an electric signal corresponding to a control term having components respectively continuously proportional to departure from course, rate of change of departure, rudder pressure and rate of change of rudder pressure, and electrical means for controlling said servo system in accordance with said signal to maintain the craft on course without hunting.

5. In automatic steering apparatus for dirigible craft, a direction maintaining instrument, means for setting a course relative to the direction maintained by said instrument, a rudder, a hydraulic servo system for positioning said rudder, means for generating an electric signal corresponding to a control term having components respectively and continuously proportional to departure from course, a first order time derivative of change of departure, a higher order time derivative of change of departure, rudder pressure and rate of change of rudder pressure, and electrical means for controlling said servo system in accordance with said signal to maintain the craft on course without hunting.

6. In automatic steering apparatus for dirigible craft, means for setting a course, a rudder, anti-hunt motive means therefor, and control apparatus for said motive means operative for maintaining the craft on a set course including a servo system for positioning said rudder, means for obtaining a control signal proportional to departure from course, means for obtaining a control signal proportional to rate of change of departure, means for obtaining a control signal continuously proportional to rudder pressure, means for combining said several signals, and means for controlling said servo system in accordance with said combined signal and the rate of change thereof.

7. Automatic control apparatus for dirigible craft comprising, a displaceable surface controlling rotation of the craft about one of its three mutually perpendicular principal axes, means for maintaining a reference direction in space, means for setting the mean position of a second principal axis relative to said direction, means for obtaining an electrical signal proportional to deviation of said second axis from said mean position, electrical means for obtaining a time derivative of said signal, means for combining said primary signal and its derivative, means for obtaining an electrical repeat-back signal proportional to fluid pressure on said surface, means for obtaining a signal proportional to the difference of said repeat-back signal and the combination of said primary signal and its derivative, electrical means for obtaining a time derivative of said difference signal, means for combining said difference signal and its derivative and a servo system operatively connected to displace said surface in accordance with said last composite signal for maintaining the craft with said second axis in the set direction without internal or external hunting.

8. Automatic control apparatus for dirigible craft comprising, a displaceable surface controlling rotation of the craft about one of its three mutually perpendicular principal axes, means for maintaining a reference direction in space, means for setting the mean position of a second principal axis relative to said direction, means for obtaining an electrical signal proportional to deviation of said second axis from said mean position, electrical means for obtaining a time derivative of said signal, means for obtaining a composite signal proportional to the algebraic sum of said primary signal and its derivative, means for obtaining an electrical repeat-back signal proportional to fluid pressure on said surface, electrical means for obtaining a time derivative of said repeat-back signal, means for obtaining a composite signal proportional to the algebraic sum of said repeat-back signal and its derivative, a servo system operatively connected to displace said surface, and means for controlling said servo system in accordance with the difference of said two composite signals to maintain the craft with said second axis in the set direction without external or internal hunting.

9. Automatic control apparatus for dirigible craft in accordance with claim 4 in which the means for obtaining said departure signal and said rudder pressure signal include tapped potentiometers energized by a D. C. supply for obtaining reversible polarity D. C. potentials proportional to the measure quantities.

10. Automatic control apparatus for dirigible craft in accordance with claim 4 in which the means for obtaining said deviation and rudder pressure signals include potentiometers supplied from a center-tapped winding of a transformer, said transformer being energized from an A. C. supply, and rectifying means connected to the output of each potentiometer for generating reversible polarity D. C. potentials proportional to the measured quantities.

11. Automatic control apparatus for dirigible craft in accordance with claim 7 in which the means for obtaining derivatives of the departure and repeat-back signals include a resistance-condenser network.

12. Control apparatus for dirigible craft comprising, a displaceable control surface, servo-means for displacing said surface, and means adapted to control said servo means continuously in accordance with the difference of two factors proportional respectively to the amount of departure from course and to counter pressure on said surface, and further means for controlling said servo means in accordance with the difference of two other factors proportional respectively to the rates of change of said first mentioned factors.

13. Automatic control apparatus for dirigible craft comprising, electrical means for measuring departure from course, electrical means for measuring rate of change of departure, a reversible hydraulic motor having a movable piston actuated by differential pressure changes on opposite ends thereof, a rudder surface operatively connected to said piston, electrical means for measuring said differential pressure, and means for controlling said motor in accordance with an electrical quantity having components proportional to departure, rate of change of departure and differential pressure on said piston, whereby the craft is maintained on course and yawing corrected without hunting.

14. In apparatus in accordance with claim 13, means for preventing hunting of said hydraulic motor comprising means for generating and adding to the motor control term as defined a component proportional to its own time rate of change.

15. In apparatus in accordance with claim 13, means for measuring the differential pressure on said piston comprising, an effectively tapped potentiometer having a movable contact and energized from a suitable potential supply, a hydraulic pressure relay actuated by the differential pressure on said piston and operatively connected to displace the movable contact of said potentiometer in accordance therewith to obtain a reversible polarity D. C. potential proportional to rudder pressure.

16. In automatic steering apparatus for dirigible craft, a direction maintaining instrument, means for setting a course relative to the direction maintained by said instrument, a rudder, a servo system for operating said rudder including a positionable member controlling the force applied by said servo system, positioning means for said member, and means for controlling said positioning means in accordance with a quantity having components respectively and continuously proportional to departure of the craft from the course set by said first named means, the fluid pressure on said rudder, and the rate of change of said pressure.

17. In automatic steering apparatus for dirigible craft, a direction maintaining instrument, means for setting a course relative to the direction maintained by said instrument, a rudder, a servo system for displacing said rudder including a positionable member controlling the force exerted by said servo system, a motor for displacing said positionable member, and continuously operative means for causing said motor to operate at a speed proportional to departure from course, fluid pressure on said rudder and rate of change of said pressure.

18. In automatic steering apparatus for dirigible craft, a direction maintaining instrument, means for setting a course relative to the direction maintained by said instrument, a rudder, a hydraulic servo system for positioning said rudder, means for generating an electric signal corresponding to a control term having a component proportional to rudder pressure including a potentiometer effectively center-tapped and energized from an A. C. supply together with a rectifier for securing a D. C. output therefrom.

19. In a rudder control system for dirigible craft, a rudder, a servo system for positioning said rudder, means for generating an electrical signal proportional to the force exerted upon said rudder, a condenser, and means for applying said signal through said condenser to control said servo system.

20. In steering apparatus for a dirigible craft, means mounted upon the craft furnishing a measure of departure of the craft from a predetermined course, a rudder for steering the craft, servo means for displacing said rudder, and means for obtaining and applying to said servo means a controlling signal having continuously effective components respectively proportional to departure from course and to the force and rate of change of force exerted by said servo means upon said rudder.

21. In automatic control apparatus for dirigible craft, a rudder controlling attitude of the craft about an axis thereof, servo means for exerting a displacing force upon said rudder, means furnishing a continuous measure of the force exerted by said servo means, means for materializing a quantity having components continuously proportional to said measured force and the rate of change thereof, and means for controlling said servo means in accordance with said last quantity.

22. In automatic control apparatus for dirigible craft, a rudder displaceable to control the angular position of the craft about an axis thereof, servo means for displacing said rudder, means furnishing a measure of deviation of the craft from a reference position about said axis, means furnishing measures of the rate of change and a higher time derivative of said deviation, means jointly and continuously controlling said servo means in accordance with said three measured quantities and repeat-back means for further continuously controlling said servo means in accordance with the force exerted thereby upon said rudder and the rate of change of said force.

23. In automatic control apparatus for dirigible craft, a rudder displaceable to control the angular position of the craft relative to a reference position, servo means for displacing said rudder, means furnishing a measure of deviation of the craft from said reference position and for automatically controlling said servo means in accordance with the measured quantity, and means actuated in proportion to the force applied to said rudder for obtaining continuous measures of said force and the rate of change thereof and for further controlling said servo means in accordance with said last two measured quantities.

24. In automatic control apparatus for dirigible craft, a rudder controlling attitude of the craft, servo means for displacing said rudder, means furnishing a measure of deviation of the craft from a reference attitude, means actuated in proportion to the force applied to said rudder by said servo means for obtaining a continuous measure of said force, means combining said two measured quantities and deriving from the combination thereof a quantity having components respectively proportional to said combination and the time rate of change of said combination, and means for controlling said servo means in accordance with said last quantity.

25. In a control system, a displaceable object, servo means for displacing said object, circuit means for obtaining a primary electric signal for controlling said servo means, means for obtaining a repeat-back electric signal having continuously effective components respectively proportional to the force exerted on said controlled object by said servo means, circuit means for combining said two signal and for obtaining from the combination thereof an electric quantity having components respectively proportional to said combination and the rate of change of said combination, and means for controlling said servo means in accordance with said last named quantity.

26. In a remote control system, a controlling object and a controlled object, servo means for positioning said controlled object, means for obtaining a primary signal having components respectively proportional to displacement and rate of change of displacement of said controlling object, means for obtaining a repeat-back electric signal having continuously effective components respectively proportional to the force exerted on said controlled object by said servo means and the rate of change of said force, circuit means for combining said two signals and for obtaining from the combination thereof an electric quantity having components respectively proportional to said combination, and means for controlling said servo means in accordance with said last named quantity.

HARVARD L. HULL.